March 14, 1950 E. L. DAVIS ET AL 2,500,630

APPARATUS FOR THE READING OF FACSIMILE AND PRINTED MATTER BY THE BLIND

Filed Sept. 15, 1947 5 Sheets-Sheet 1

INVENTORS
EDWIN L. DAVIS AND
OLAR T. HINTON, JR
BY [signature]
ATTORNEY

March 14, 1950 E. L. DAVIS ET AL 2,500,630

APPARATUS FOR THE READING OF FACSIMILE AND PRINTED MATTER BY THE BLIND

Filed Sept. 15, 1947 5 Sheets-Sheet 2

Inventors
EDWIN L. DAVIS AND
OLAR T. HINTON, JR.

By [signature]

ATTORNEY

March 14, 1950 E. L. DAVIS ET AL 2,500,630

APPARATUS FOR THE READING OF FACSIMILE AND PRINTED MATTER BY THE BLIND

Filed Sept. 15, 1947 5 Sheets-Sheet 3

Inventors

EDWIN L. DAVIS AND OLAR T. HINTON, JR.

By [signature]

ATTORNEY

Inventors
EDWIN L. DAVIS AND
OLAR T HINTON, JR.
By B. P. Wilbur
ATTORNEY

INVENTORS
EDWIN L. DAVIS AND
OLAR T. HINTON, JR.
BY [signature]
ATTORNEY

Patented Mar. 14, 1950 2,500,630

UNITED STATES PATENT OFFICE 2,500,630

APPARATUS FOR THE READING OF FACSIMILE AND PRINTED MATTER BY THE BLIND

Edwin L. Davis, Anderson, and Olar T. Hinton, Jr., Pickens, S. C.

Application September 15, 1947, Serial No. 774,112

4 Claims. (Cl. 179—100.3)

Our invention relates broadly the electrical recording and reproduction of sounds corresponding to written or printed matter and more particularly to a method and apparatus for enabling the blind to read printed, written or facsimile matter.

The object of our invention is to provide a method and apparatus for enabling the blind to read printed, written, or facsimile matter wherein the matter is selectively scanned to produce corresponding variations in electric current, which are amplified and utilized to control entirely independent current variations that correspond to audible reproduction of the printed, written or facsimile matter originally scanned which latter current variations are amplified and reproduced as sound.

Another object of our invention is to provide a compact arrangement of apparatus in which printed, written or facsimile matter is pre-recorded as a light trace representing audible sound corresponding to the printed, written or facsimile matter and such sound record selectively controlled by a process of scanning original printed written or facsimile matter to effect reproduction of the recorded audible sound corresponding to the matter scanned.

A still further object of our invention is to provide a compact construction of sound recording apparatus bearing sound records of a wide variety of printed written and facsimile symbols operative to reproduce sounds under control of scanning means operative over the original printed written or facsimile matter.

Still another object of our invention is to provide an arrangement of electronic circuits for precalibrating a sound recording apparatus with a wide stock of audible sounds corresponding to original printed, written, or facsimile matter adapted to be selected and reproduced by a process of scanning printed written or facsimile matter as audible sounds.

A still further object of our invention, is to provide a construction of storage device for audible sounds corresponding to printed, written, and facsimile symbols comprising a rotatably driven cylinder containing light trace recordings successively spaced along the cylinder for each printed written or facsimile symbol to be reproduced in combination with means for selectively activating each sound trace as an original printed written or facsimile symbol is scanned for reproducing from the corresponding record an audible sound representative of the printed written or facsimile symbol scanned.

Figure 1:
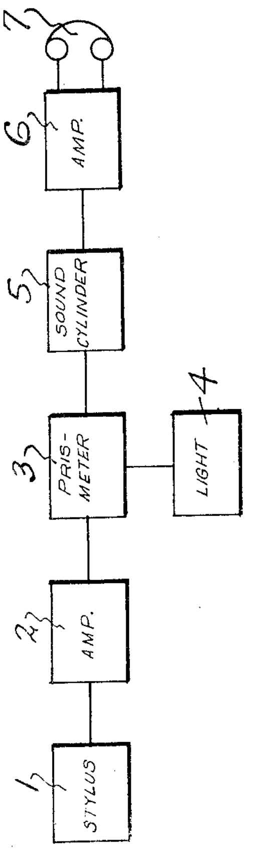
Figure 2:
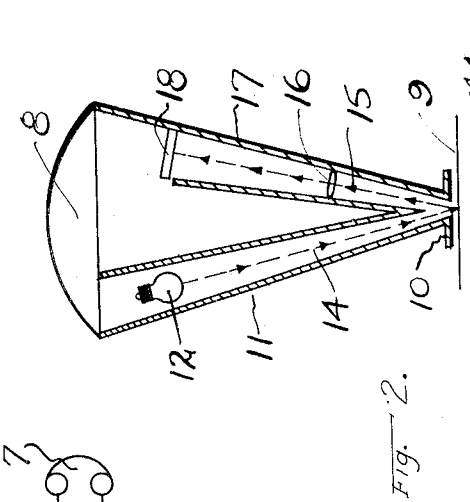
Figure 11:
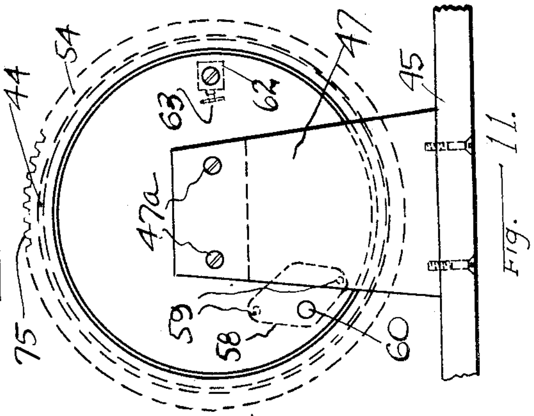
Figure 10:
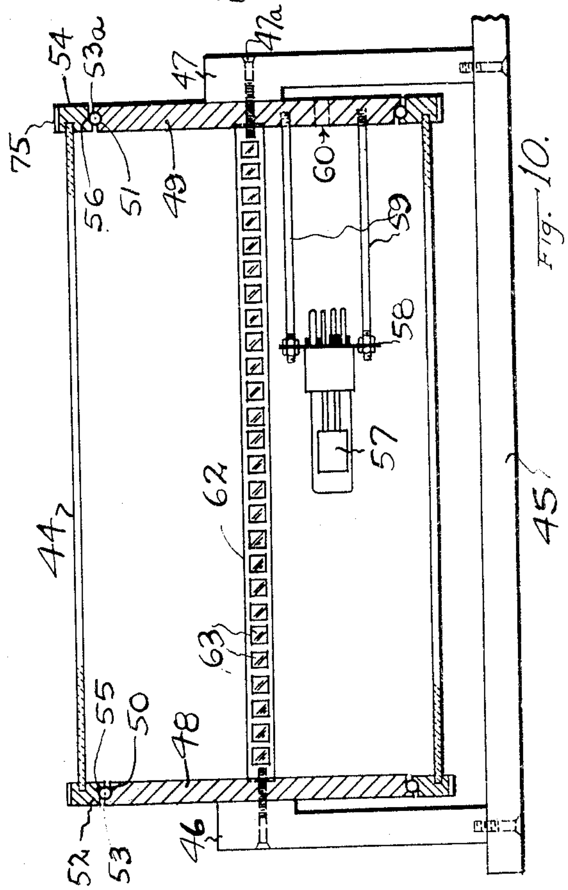
Figure 3:
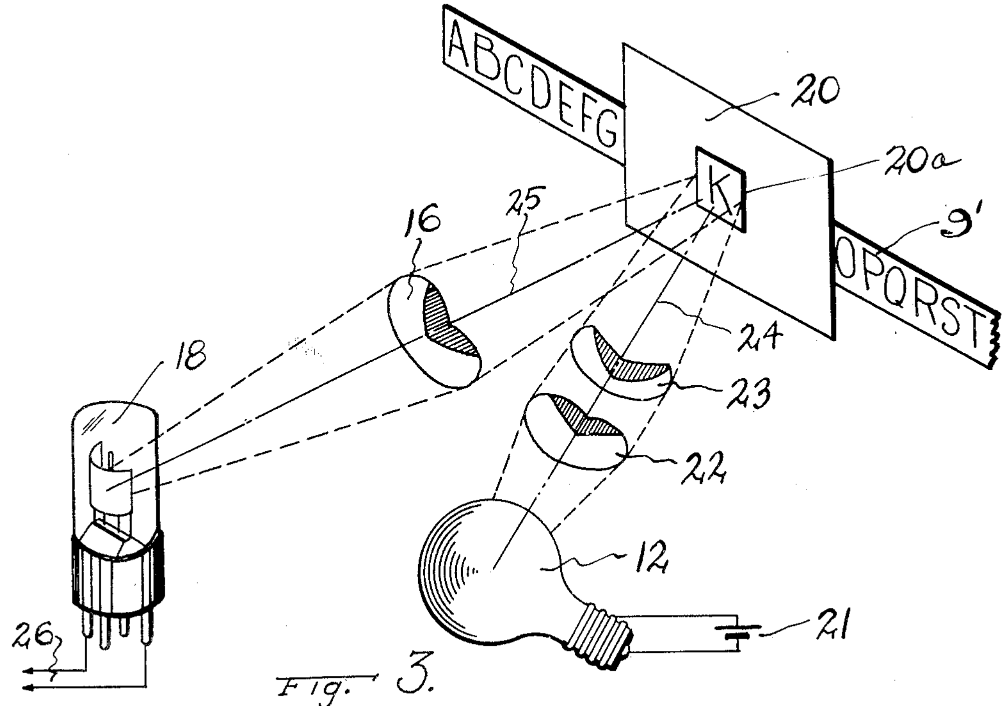
Figure 4:
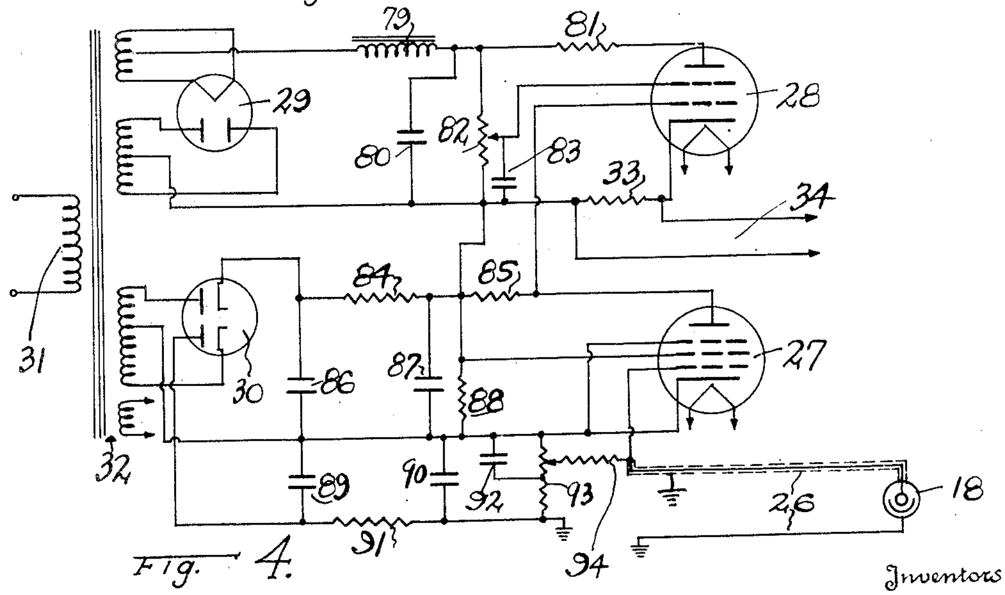
Figure 5:
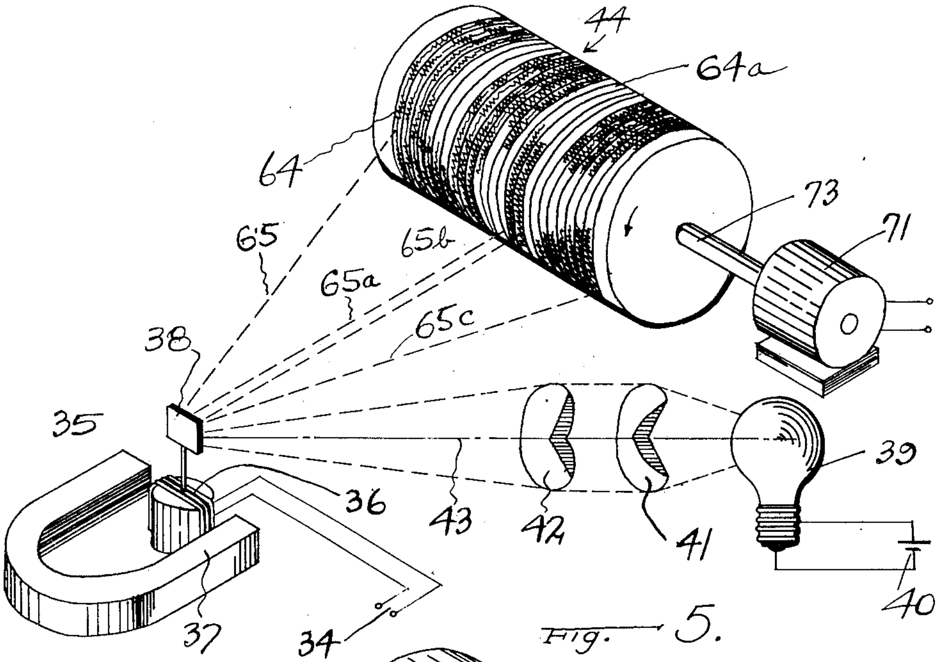
Figure 6:
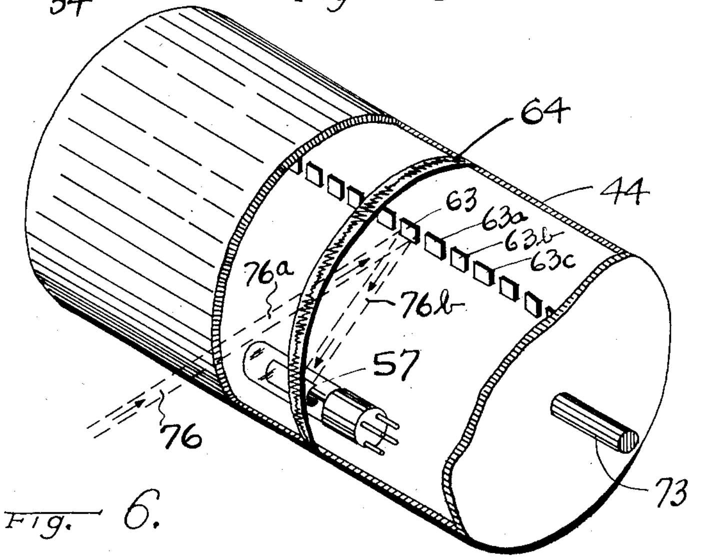
Figures 7, 8, 9:
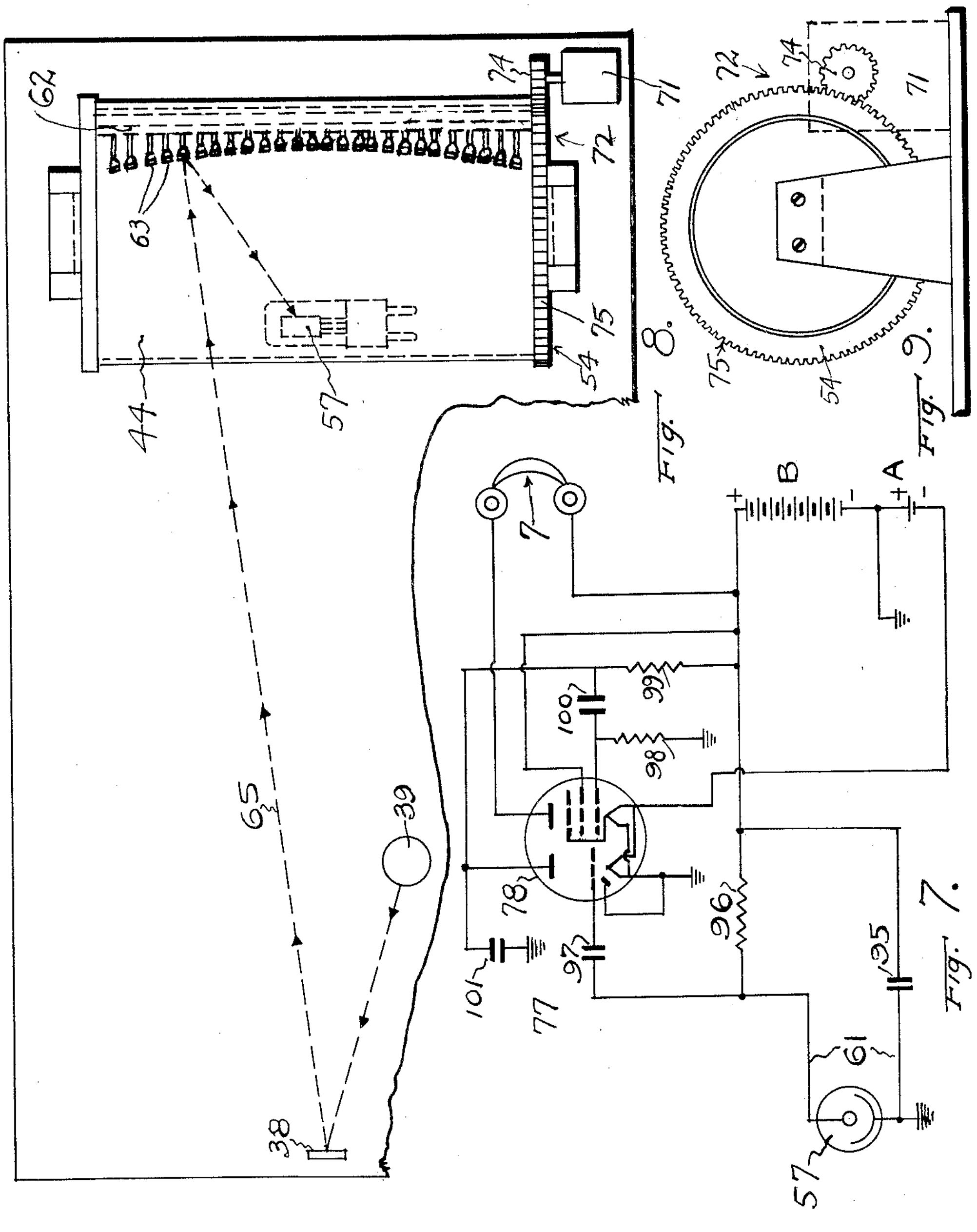
Figure 12:
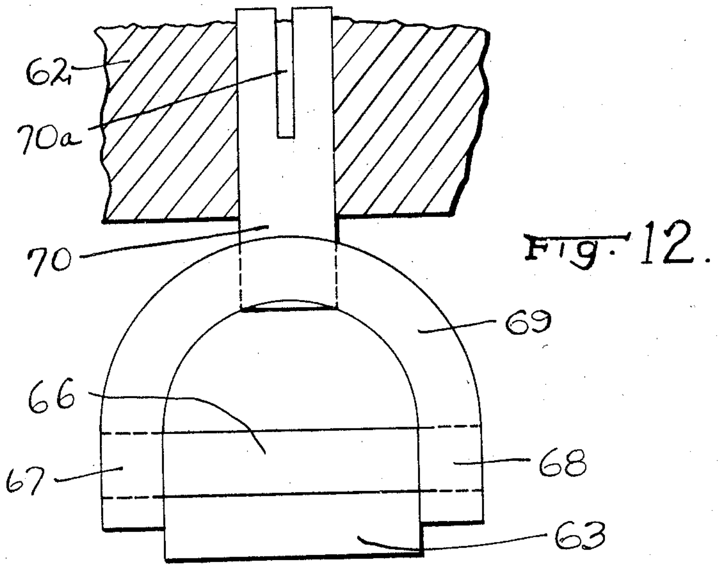
Figures 13, 14:
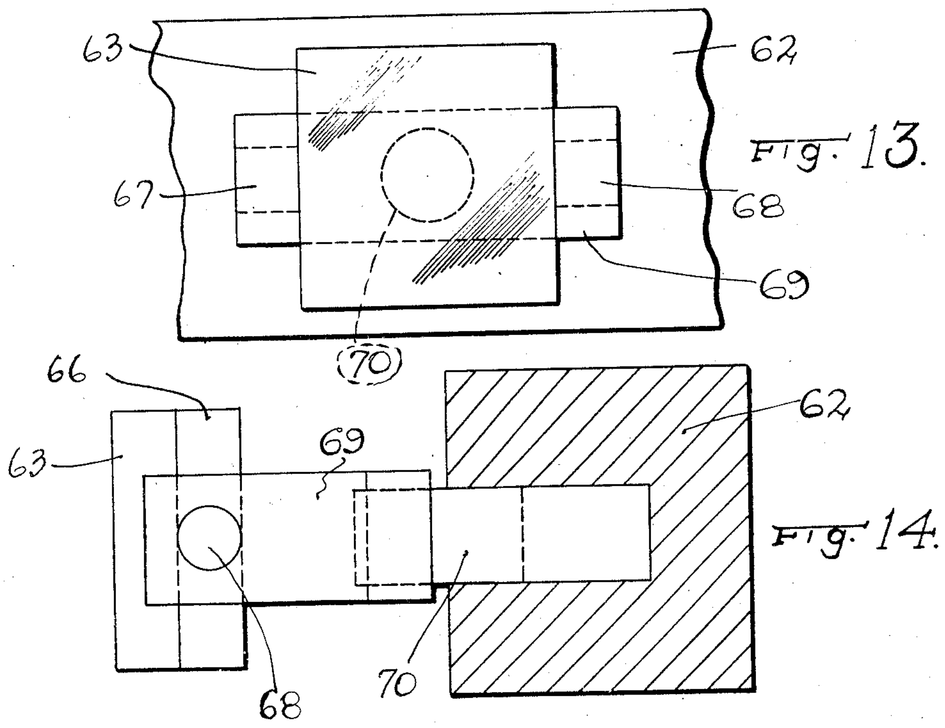

Other and further objects of our invention reside in the combination of sound storage system and selector means therefore as set forth more fully in the specification hereinafter following by reference to the accompanying drawings in which Figure 1 is a block diagram illustrating the principles of operation of the system of our invention; Fig. 2 is a cross-sectional view of one form of reading head used in the system of our invention; Fig. 3 is a schematic view showing the manner of scanning the reading matter to be reproduced in accordance with the system of our invention; Fig. 4 diagrammatically illustrates one form of circuit which may be employed in connection with the reading head of our invention; Fig. 5 is a schematic view illustrating the mechanism for converting the electrical impulses developed in the reading circuit for scanning the sound cylinder employed in the system of our invention; Fig. 6 is a perspective view of the sound cylinder showing the arrangement of mirrors therein and the photo-electric cell associated therewith; Fig. 7 is a diagrammatic view of the reproducing circuit associated with the sound cylinder; Fig. 8 is a schematic view of the sound cylinder and the light directing means associated therewith; Fig. 9 is an end view of the sound cylinder driving mechanism; Fig. 10 is a transverse vertical sectional view through the sound cylinder and illustrating the arrangement of mirrors and photo-electric cell associated therewith; Fig. 11 is an end view of the sound cylinder illustrated in Figure 10; Fig. 12 is an enlarged top plan view of one of the adjustable mirrors employed in the sound cylinder; Fig. 13 is an enlarged front view of one of the adjustable mirrors in the sound cylinder; and Fig. 14 is an enlarged end elevational view of one of the adjustable mirrors in the sound cylinder.

Our invention is directed to a novel method and apparatus for the reading of printed matter by the blind. Details of the operation and the type, size and value of circuit components employed in our system may be changed and varied but the underlying principles of our development are fundamental, and we wish to include within the scope of our invention such variations and improvements as may be set forth within the scope of our claims herein. In order to clarify the nature of our invention we classify the components of our invention as follows:

Stage I (represented by Fig. 3) where variations in reflected light are changed into small variations of electric current.

Stage II (represented by Fig. 4) where these small variations of electric current are amplified.

Stage III (represented by Figs. 5 and 6) where these amplified variations of electric current cause entirely new current variations that correspond to spoken letters of the alphabet.

Stage IV (represented by Fig. 7) where these new current variations are amplified and reproduced as spoken letters of the alphabet.

The principles of our invention are shown by block diagram in Figure 1 wherein reference character 1 designates the scanning mechanism used in the method and apparatus of our invention. The scanning mechanism 1 connects to amplifier 2, the output of which connects to the prismeter 3 subject to the constant light source designated at 4. The prismeter 3 is associated with the sectionalized sound storage cylinder 5 which contains a light sensitive cell sound reproducing circuit which connects to amplifier 6 the output of which connects to the telephone head set 7.

The details of the scanner are shown in Fig. 2 in which reference character 8 represents a carrier for moving the scanner step by step for scanning each successive character on the sheet of matter 9 containing the printed written or facsimile symbols to be read. The carrier 8 contains two substantially frusto conical channel portions directed toward the terminus 10 of the scanner. One of the channel portions 11 contains light source 12 which directs light rays along path 14 to the sheet of matter 9. The light rays strike the characters on the sheet of matter 9 and are reflected according to the shape or contour of the characters along the path 15 through lens system 16 in channel portion 17 in which the light is directed upon light sensitive cell 18 supported on carrier 8.

In Fig. 3 we have shown a specimen of blocked printed matter represented in this view by reference character 9' in the form of a tape which may be advanced behind the letter positioning frame 20 as the blind person reads the printed matter letter by letter. The letter positioning frame 20 is apertured at 20*a* to allow only one letter on the tape 9' to appear at any one time. The size of the opening 20*a* is extremely critical and must wholly block out all letters except that letter which is to be reproduced. The light source 12 energized from suitable power source represented at 21 is directed toward the printed matter on tape 9' through plano-convex lenses 22 and 23 and opening 20*a* which are all located upon the axis 24 of the light beam emanating from the light source 12. The printed matter on strip 9' consists of letters in distinctive colored contrast to the background of the tape 9'. We have found that block letters printed in black and in capitals upon a white background produce the most satisfactory results. We have successfully used 24 point condensed Gothic letters. The reflection of light from the individual letters viewed through aperture 20*a* is effected along optical axis 25 through double-convex lens 16. The light returned by each individual letter is focused upon photo-electric cell 18 which is the cell previously described in connection with Fig. 2. We have used with considerable success a standard gas-filled photoelectric cell tube type 923. The photo-electric cell 18, the double-convex lens 6 and the optical aperture 20*a* are all disposed along the light reflection optical axis. Wires 26 lead from the photo-electric cell 18 to the photo-electric cell amplifier circuit illustrated in Fig. 4.

Fig. 4 is a schematic diagram of the photoelectric cell amplifier circuit which comprises the 6SJ7 triple-grid detector amplifier 27 associated with the power amplifier tube 6V6 shown at 28. Tubes 27 and 28 are resistively coupled and the tubes have their anode circuits powered from the full wave rectifier 29 (80 type) and the twin diode 30 (6H6 type). The power circuit for the amplifier connects to the 110 volt power source through primary winding 31 of power transformer 32. The current impulses representative of the characteristics of each letter in the printed matter 9' are impressed upon the control grid circuit of tube 27 and produced in the output circuit of tube 28 a voltage drop across resistor 33 that causes corresponding fluctuations in circuit 34 leading to the voltmeter 35 shown more clearly in Fig. 5.

The voltmeter 35 comprises part of the prismeter described at 3 in Fig. 1. The stylus in block 1 of Fig. 1 has already been described in connection with Figs. 2 and 3, while the amplifier in block 2 of Fig. 1 has been described in connection with Fig. 4. The prismeter in block 3 shown more clearly in Fig. 5 includes the voltmeter 35 having a D'Arsonval moving coil 36 journalled within the magnetic field structure 37 for operating the mirror 38. Mirror 38 is axially mounted on the shaft of the moving coil armature device 36 and is angularly displaced in accordance with the characteristic current impulses incident to the different shapes of letters as supplied over the output circuit 34 from the photo-electric cell amplifier of Fig. 4. The light source 39 energized from suitable power source 40 and forming the light source inclosed by block 4 of Fig. 1 is directed toward the mirror 38 through the plano-convex lenses 41 and 42 positioned upon the axis 43 directed toward the mirror 38. The light beam thus directed upon the mirror 38 is caused to shift in its angular position over a sweep path within selected limits of the scanning path of mirror 38. Mirror 38 is directed toward the sound cylinder shown generally at 44 in Fig. 5 as represented in the block diagram of Fig. 1 at 5.

The sound cylinder 44 is constructed from transparent material such as Lucite, glass or transparent plastic and is mounted at opposite ends so that the cylinder may be continuously revolved. Figs. 10 and 11 illustrate the mounting of the sound cylinder 44 on the base of insulation material 45 on which the standards or end supports 46 and 47 are mounted. The standards 46 and 47 are each fastened to the circular end plates of insulation material 48 and 49 in any suitable manner such as by means of screw members 47*a*. The circular end plates 48 and 49 each have peripheral ball races 50 and 51 therein for mounting the end rings 52 and 54 on the ball bearings represented at 53 and 53*a*. Ball races are provided in the interior annular faces of ring members 52 and 54 complementary to the ball races 50 and 51 so that ring members 52 and 54 are free to revolve with no appreciable friction.

An annular groove 55 is formed in ring member 52 and a corresponding annular groove 56 is formed in ring member 54 directed toward and in alignment with annular groove 55 for receiving therebetween the transparent cylinder 44. A photo-electric cell 57 is mounted within the transparent cylinder 44 at substantially the center thereof on a socket support 58 which is mounted on longitudinally extending standards 59 extending from the end plate 49. An aperture 60 in end plate 49 provides for establishing connection with the terminals of photo-electric cell 57. I have diagrammatically represented these leads at 61 in Fig. 7 which is the amplifier represented by block diagram 6 in Fig. 1 leading to the telephone receivers 7 which are worn by the blind person engaged in reading the printed matter 9'.

The end plates 48 and 49 of the sound cylinder serve as supports adjacent remote edges thereof for the bar member 62 which extends longitudinally therebetween in a position diametrically aligned with the points of support for the end plates 48 and 49. Bar member 62 serves as a support for the multiplicity of adjustable mirrors represented at 63 spaced one from another and individual to the spaced sound tracks 64 carried by sound cylinder 44. Each mirror is individually adjustable in its angular position. The structure of the mirrors is illustrated more clearly in Figs. 12, 13 and 14 on an enlarged scale. The mirrors are individually adjustable and are set with their plane faces substantially in a curved plane with the mirror 38 of voltmeter 35, the center of curvature thereof. As will be clear from Fig. 8 the individual mirrors 63 are each adjusted so that a sweep of the light beam 65 in a substantially transverse path from the light source 39 as it selectively moves from one position to another as represented in Fig. 5 at positions 65, 65*a*, 65*b* and 65*c*, etc. will scan any one of the mirrors 63 selectively set in position along the supporting bar 62.

Each adjustable mirror 63 consists of an approximately ¼" x ¼" x $\frac{1}{16}$" thick front surface mirror glued to a metal backmember 66. The metal backmember 66 has a pair of oppositely extending pins 67 and 68 projecting therefrom. These pins are approximately $\frac{3}{32}$" in diameter and extend into apertures in the metallic yoke 69. The metallic yoke 69 has a pin 70 projecting rearwardly therefrom. The pin 70 is approximately $\frac{3}{32}$" in diameter and approximately ⅜" long and fits snugly into a corresponding aperture in the supporting bar 62. Pin 70 is spilt at 70*a* so that sufficient resiliency is imparted to the pin to enable the pin to be plugged into the aperture in supporting bar 62 and readily shifted in position therein or withdrawn for the substitution of another mirror under conditions of maintenance and repair. By virtue of the mounting of mirror 63 in yoke 69 on pins 67 and 68 the mirror is substantially universally adjustable in position so that the plane surface of each mirror may be readily adjusted to receive and direct the light beam 65 to the centrally positioned photo-electric cell 57.

The sound cylinder 44 of transparent material carries on its surface twenty-six separate sound tracks represented at 64, one sound track being individual to each spoken letter of the alphabet. There is one sound track for the letter "A," a separate sound track for the letter "B," a separate sound track for the letter "C," and so on through the alphabet to the letter "Z." These sound tracks may be applied as strips of film to the transparent surface of cylinder 44, or a composite recording may be made in closely adjacent positions and the film record wrapped around the surface of sound cylinder 44. By way of example I have represented in Fig. 5 the sound track recording of the letter "K" in the position represented at 64*a* in Fig. 5 wherein the light beam 65 is reflected from mirror 38 between the positions 65*a* and 65*b* on to the sound track 64. This illustration indicates the position to which mirror 38 is angularly shifted upon receipt of signal impulses representative of the letter "K" which is scanned as in the arrangement shown in Fig. 3. The sound track recorded on cylinder 44 for letter "A" and the sound track recorded on cylinder 44 for the letter "Z" are not necessarily located at opposite ends of the sound cylinder 44 but are located on the sound cylinder in positions which have been found to be, by experimentation, the proper positions to which mirror 38 is moved upon receipt of the signal impulses representative of the characteristic shape of the letter being scanned.

The sound track for the letter "I" is placed adjacent the extreme left end of the sound cylinder 44 due to the fact that more light will be reflected from around the letter "I" in opening 20*a* Fig. 3. Likewise the sound track for the letter "M" is placed adjacent the extreme right end of the sound cylinder 44 due to the fact that less light will be reflected from around it than for any other letter of the alphabet. Thus the maximum and minimum amplitude and the intermediate characteristics of the current pulses developed by the characteristic shapes of the letters control the relative positioning of the sound traces. For the purposes of simplifying the description of my invention I have omitted mention of numerals or figures representing facsimile symbols but it will be understood that the sound traces on cylinder 44 may include figures and symbols and that placement of the sound traces on the cylinder depend upon the interpolation of the several sound traces representing the letters of the alphabet, figures and symbols according to the amplitude and characteristics of the current pulses representing such figures, numerals and symbols for effecting angular movement of mirror 38 to that angular position which will render effective the pre-recorded sound trace representing that figure numeral or symbol on cylinder 44.

Sound cylinder 44 is driven by motor 71 at the particular speed at which the sound tracks on cylinder 44 are recorded through suitable gear system 72 as shown in Figs. 8 and 9. In the schematic views of Figs. 5 and 6 I have shown a direct connection between motor 71 and cylinder 64 through shaft 73 but the manner of driving the cylinder 44 at the required speed is represented more fully in Figs. 8 and 9, where pinion 74 of gear teeth 75 formed on ring member 54 for driving cylinder 44.

Fig. 6 shows a cut-away section of the sound cylinder 44. The sound track 64 for the letter "K" is shown in position with light beam 76 passing through it (becoming light beam 76*a*) and being directed upon front surface mirror 63 and then being reflected as light beam 76*b* back on to photo-electric cell 57. Only one sound track is shown in position on the sound cylinder 44 for the purpose of clarity. For each individual sound track there is located directly behind it and inside the sound cylinder a small front surface mirror 63, 63*a*, 63*b*, 63*c*, etc. The purpose of each of these small mirrors is to reflect the light beam that passes through the sound track back upon photocell 57. The light beam 76*a* that reaches the small mirror 63 will vary in intensity as the sound track passes through the light beam 76. This varying light beam 76*b* is directed upon photo-cell 57 by mirror 63. Light beam 76*b* causes a varying current to flow through photo-cell 57. This varying current passes through wires 61 to the photo-electric cell amplifier 77, Fig. 7.

Fig. 7 is a schematic diagram of the circuit used in the final stage of the apparatus. In this stage the current variations corresponding to the variations of the spoken letters of the alphabet as recorded on cylinder 44 and selected by movement of mirror 38 are amplified and reproduced as audible speech in a set of earphones 7. Photo-cell 57 is shown in both Figs. 6 and 7. Earphones 7 reproduce amplified current variations as spoken letters of the alphabet. The circuit shown in Fig. 7 employs a diode triode power amplifier pentode 78 of the ID8—GT class forming an extremely compact-dry-cell operated amplifier having a minimum of circuit components.

In the circuits which we have successfully operated we have found the following circuit components desirable:

*Fig. 4*

| | |
|---|---|
| Tube 29 | 80 type |
| Choke 79 | 10 henries |
| Condenser 80 | 8 mfd. |
| Resistor 81 | 10,000 ohms |
| Resistor 82 | 25,000 ohms |
| Condenser 83 | 8 mfd. |
| Resistor 84 | 10,000 ohms |
| Resistor 85 | 500,000 ohms |
| Condenser 86 | 8 mfd. |
| Condenser 87 | 8 mfd. |
| Resistor 88 | 50,000 ohms |
| Condenser 89 | 8 mfd. |
| Condenser 90 | 8 mfd. |
| Resistor 91 | 10,000 mfd. |
| Condenser 92 | .25 mfd. |
| Resistor 93 | 5,000 ohms |
| Resistor 94 | 10 megohms |
| Tube 28 | 6V6 |
| Tube 27 | 6SJ7 |
| Tube 30 | 6H6 |

*Fig. 7*

| | |
|---|---|
| Tube 78 | 1D8GT |
| Condenser 95 | 8 mfd. |
| Resistor 96 | .5 megohms |
| Condenser 97 | .25 mfd. |
| Resistor 98 | 2 megohms |
| Resistor 99 | 50,000 ohms |
| Condenser 100 | .005 mfd. |
| Condenser 101 | .002 mfd. |

In the operation of the system of our invention light from lamp 2 (Fig. 3) passes through lenses 22 and 23 and is directed upon the opening 20a in letter positioning frame 20. In this description of operation we are assuming that the letter "K" on tape 9' is in position. Light reflected from the white surface around the letter "K" passes through lens 16 and is focused upon the sensitive surface of photo-cell 18 causing an electric current to flow in proportion to the amount and characteristic of the reflected light. Wires 26 carry this current flow from photo-cell 18 to the input of photo-cell amplifier Fig. 4 where it is amplified. It may be pointed out here that the current flow through photo-cell 18 is steady and constant for as long as the letter "K" stays in position in opening 20a. The voltage drop across resistor 33, Fig. 4, which is amplified as a result of the current flow through photo-cell 18, is carried over wires 34 to voltmeter 35 resulting in a definite and steady deflection of the moving coil 36 of the voltmeter 35. Here again this deflection will remain constant so long as the letter "K" is kept in position. Light from lamp 39 passes through lenses 41 and 42 and is focused upon mirror 38 (Fig. 5). Light beam 76 is reflected from mirror 38 through sound track 64a on cylinder 44 (Fig. 6). Up to this point light beam 76 has been steady and of a constant intensity. As it passes through sound track 64a on cylinder 44 it becomes light beam 76a whose intensity varies as the sound track 64a on sound cylinder 44 is revolved. Light beam 76a is reflected by mirror 63 to photo-cell 57 as shown at 76b causing varying currents to flow through photo-cell 57. These varying currents corresponding to the varying light beam 76a caused by the sound track 64 pass through wires 61 (Fig. 7) to the input of the photo-electric cell amplifier 77 as shown in Fig. 7. In photo-electric cell amplifier 77 these varying currents are amplified and reproduced as audible speech in the earphones 7. For our particular explanation case the letter "K" is audibly reproduced in the earphones. This same sequence of events occurs as other letters of the alphabet are moved into position in opening 20a. If, for example, the letter "A" were moved into position; the letter "A" would be heard in the earphones and so on for each letter of the alphabet.

It must be understood that proper shielding of the different components from foreign lights is essential. In the particular case of the sound cylinder 44, a shield must be provided which will eliminate all foreign lights and emit only a narrow band of light from light beam 76 as it takes up its position over each individual sound track. Furthermore, this light beam 76 is shielded from all other sound tracks on the sound cylinder except the particular one upon which it is directed.

The photo-electric cell 57 may be renewed from time to time by removing standard 47 from base 45 while disconnecting bar 62 and withdrawing socket 58 to give access to the socket for removing and replacing the photocell 57.

Similarly, the figures and facsimile symbols are reproduced as spoken words in telephones 7. The fundamental principle throughout all of the reproductions is that the characteristics of the letter figure or symbol that is scanned are not directly audibly reproduced but serve as a selection means for activating a channel of speech already recorded on the sound cylinder 44 which directly corresponds to the selecting impulses. This recorded sound trace is then reproduced at very substantial volume in the telephones 7 giving to the blind person an audible reproduction of each letter figure or symbol moved into opening 20a.

While we have described our invention in certain of its preferred embodiments we realize that modifications may be made and we desire that it be understood that no limitations upon our invention are intended other than are imposed by the scope of the appended claims.

What we claim as new and desire to secure by Letters Patent of the United States is as follows:

1. In a system of reproducing sound, a rotatably driven sound cylinder having recorded thereon a multiplicity of adjacent sound record prerecorded bands representative of characters and symbols to be acoustically reproduced, a light directing mirror disposed externally of said sound cylinder, a plurality of linearly arranged reflecting mirrors disposed substantially horizontally along one side of the interior of said sound cylinder individual to each of said sound record bands, means for locating said reflecting mirrors in a substantially curved path with said externally arranged light directing mirror as a center, a light source focused on said light directing mirror whereby said light directing mirror in various positions directs a light beam selectively through the individual sound record bands on said sound cylinder, a sound reproducing circuit responsive to the recorded sounds, a photo-electric cell disposed within said cylinder in a position to receive scanned light rays reflected by said reflecting mirrors and connected with said sound reproducing circuit, an optical scanner comprising a framing device for segregating each character and symbol corresponding to said pre-recorded sounds to be reproduced, means for scanning each character and symbol through said framing device said last mentioned means controlling the position of said light directing mirror for selectively activating the corresponding sound record band on said sound cylinder and exciting said photo-electric cell for selectively reproducing the sound corresponding to said character or symbol in said sound reproducing circuit.

2. In a system of reproducing sound, a rotatably driven sound cylinder having recorded thereon a multiplicity of adjacent sound record bands representative of characters and symbols to be reproduced, a light directing mirror disposed externally of said sound cylinder, a plurality of reflecting mirrors disposed substantially horizontally along one side of the interior of said sound cylinder individual to each of said sound record bands, means for locating said plurality of reflecting mirrors in a substantially curved path with said externally arranged light directing mirror as a center, means for individually adjusting the angular position of each of said reflecting mirrors to correspond with the direction of light rays received through said sound record bands on said sound cylinder, a light source focused on said light directing mirror whereby said light directing mirror in various positions directs a light beam selectively through the individual sound record bands on said sound cylinder, a sound reproducing circuit responsive to the recorded sounds, a photo-electric cell disposed with said cylinder out of the path of the aforesaid light beam and in a position to receive scanned light rays reflected by said reflecting mirrors and connected with said sound reproducing circuit, an optical scanner comprising a framing device for segregating each character and symbol corresponding to said pre-recorded sounds to be reproduced, means for scanning each character and symbol through said framing device, said last mentioned means controlling the position of said light directing mirror for selectively activating the corresponding sound record band on said sound cylinder and selectively exciting said photoelectric cell for reproducing the sound corresponding to said character or symbol in said sound reproducing circuit.

3. Scanning apparatus comprising a support, a pair of standards mounted in spaced positions on said support, a circular end plate carried by each of said standards and having annular raceways thereon, a pair of ring members mounted for rotation on said raceways, a circular rack formed on one of said ring members, drive means engaging said circular rack for imparting rotation thereto, a transparent cylinder mounted between said ring members, a bar member extending longitudinally between said circular end plates and within and adjacent one side of the interior of said transparent cylinder, a multiplicity of spaced adjustable mirrors carried by said longitudinally extending bar member, a photo-electric cell supported by one of said circular end plates symmetrically with respect to all of said adjustable mirrors and mounted within said cylinder in a position adjacent the interior wall of said cylinder opposite said longitudinally extending bar member, a multiciplicity of sound wave traces recorded in circular tracks upon the transparent wall of said cylinder in the sweep path of a light beam directed from an external position through the transparent wall of said cylinder to selected adjustable mirrors within said cylinder whereby the light beam after passing through the selected sound wave trace on said cylinder is reflected from the aligned reflecting mirror to the photo-electric cell within said cylinder.

4. Scanning apparatus comprising a support, a pair of standards mounted in spaced positions on said support, a circular end plate carried by each of said standards and having annular raceways thereon, a pair of ring members mounted for rotation on said raceways, a circular rack formed on one of said ring members, drive means engaging said circular rack for imparting rotation thereto, a transparent cylinder mounted between said ring members, a bar member extending longitudinally between said circular end plates and within and adjacent one side of the interior of said transparent cylinder, a multiplicity of spaced adjustable mirrors a pintle individual to each of said mirrors and adjustably supported in linearly spaced sockets in said longitudinally extending bar member and movable into and out of the sockets for positioning said mirrors in a substantially curved path one with respect to another, a photo-electric cell supported by one of said circular end plates and positioned symmetrically with respect to all of said adjustable mirrors and mounted within said cylinder in a position adjacent the interior wall of said cylinder opposite to and below the horizontal plane of said longitudinally extending bar member, a multiplicity of sound wave traces recorded in circular tracks upon the transparent wall of said cylinder in the sweep path of a light beam directed from an external position through the transparent wall of said cylinder to selected adjustable mirrors within said cylinder whereby the light beam after passing through the selected sound wave traces on said cylinder is reflected from the aligned reflecting mirror to the photoelectric cell within said cylinder.

EDWIN L. DAVIS.
OLAR T. HINTON, JR.

REFERENCES CITED

The following references are of record in the file of this patent:

UNITED STATES PATENTS

| Number | Name | Date |
|---|---|---|
| 2,002,352 | Owens | May 21, 1935 |
| 2,006,890 | Grossmann | July 2, 1935 |
| 2,034,803 | Fuller | Mar. 24, 1936 |
| 2,054,216 | Fuller | Sept. 15, 1936 |
| 2,063,184 | Myers | Dec. 8, 1936 |
| 2,124,673 | Puma | July 26, 1938 |
| 2,228,782 | Sharples | Jan. 14, 1941 |
| 2,432,123 | Potter | Dec. 9, 1947 |